(12) United States Patent
Sun et al.

(10) Patent No.: US 12,233,571 B2
(45) Date of Patent: Feb. 25, 2025

(54) CONSTRUCTION METHOD FOR SPATIAL AGGREGATE REINFORCED 3D PRINTED CONCRETE STRUCTURE

(71) Applicant: ZHEJIANG UNIVERSITY, Hangzhou (CN)

(72) Inventors: Xiaoyan Sun, Hangzhou (CN); Hailong Wang, Hangzhou (CN); Baixing Ye, Hangzhou (CN); Long Chen, Hangzhou (CN); Zhicheng Zhang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 299 days.

(21) Appl. No.: 17/769,750

(22) PCT Filed: Oct. 16, 2020

(86) PCT No.: PCT/CN2020/121534
§ 371 (c)(1),
(2) Date: Apr. 17, 2022

(87) PCT Pub. No.: WO2021/078074
PCT Pub. Date: Apr. 29, 2021

(65) Prior Publication Data
US 2022/0402164 A1    Dec. 22, 2022

(30) Foreign Application Priority Data
Oct. 21, 2019   (CN) .......................... 201911000935.9

(51) Int. Cl.
*B28B 1/00*    (2006.01)
*B28B 1/52*    (2006.01)
(Continued)

(52) U.S. Cl.
CPC .............. *B28B 1/001* (2013.01); *B28B 1/522* (2013.01); *B28B 23/022* (2013.01); *B33Y 10/00* (2014.12); *B33Y 50/02* (2014.12); *B33Y 70/00* (2014.12)

(58) Field of Classification Search
CPC ....... B28B 1/001; B28B 1/522; B28B 23/022; B28B 21/00; B28B 21/52; B28B 21/56; B28B 3/2645; B28B 23/005
See application file for complete search history.

(56) References Cited

U.S. PATENT DOCUMENTS

2012/0247058 A1\*  10/2012  Alfonso .................... E04C 5/20
                                                           52/686
2018/0071949 A1\*   3/2018  Giles ....................... B28B 1/001

FOREIGN PATENT DOCUMENTS

CN           105756187 A  *  7/2016
CN           106738898         5/2017
(Continued)

*Primary Examiner* — Alison L Hindenlang
*Assistant Examiner* — Keran V Nguyen
(74) *Attorney, Agent, or Firm* — Jiwen Chen; Joywin IP Law PLLC

(57) ABSTRACT

A construction method for a spatial aggregate reinforced 3D printed concrete structure, includes: selecting a structural member, performing mechanical analysis, and determining a basic dosage and a printing and weaving process of an implanted reinforcement, determining a type, positioning and dosage of a spatial aggregate, preparing 3D printing materials, editing an electromagnetic signal and positioning push program according to the selected positioning and dosage of the spatial rigid aggregate, the 3D printing material is extruded along the printing and weaving process and the spatial rigid aggregate is evenly scattered, and realizing the connection between spatial aggregates and the connection between the spatial aggregates and the reinforcements, a spatial aggregate reinforced 3D printed concrete structure (Continued)

is formed after layer-by-layer construction, superimposed and hardened, or after segmented printing, component nodes are connected through lap design of preset tenon and mortise and reinforcement.

7 Claims, 3 Drawing Sheets

(51) Int. Cl.
*B28B 23/02* (2006.01)
*B33Y 10/00* (2015.01)
*B33Y 50/02* (2015.01)
*B33Y 70/00* (2020.01)

(56) References Cited

FOREIGN PATENT DOCUMENTS

| | | |
|---|---|---|
| CN | 108891029 | 11/2018 |
| CN | 109129827 | 1/2019 |
| CN | 109227875 | 1/2019 |
| CN | 109304788 | 2/2019 |
| KR | 20180016100 | 2/2018 |

* cited by examiner a b c d e

CONSTRUCTION METHOD FOR SPATIAL AGGREGATE REINFORCED 3D PRINTED CONCRETE STRUCTURE

This is a U.S. national stage application of PCT Application No. PCT/CN2020/121534 under 35 U.S.C. 371, filed Oct. 16, 2020 in Chinese, claiming priority to Chinese Patent Applications No. 201911000935.9, filed Oct. 21, 2019, all of which are hereby incorporated by reference.

TECHNICAL FIELD

The present invention belongs to the technical fields of building materials, building structures, modeling design and the like, and particularly relates to a construction method of a spatial aggregate reinforced 3D printed concrete structure.

BACKGROUND TECHNOLOGY

As a rapid prototyping and additive manufacturing technology, 3D printing has been rapidly and widely promoted in various industries since its invention. 3D printing buildings and structures can effectively reduce construction waste, improve construction efficiency, shorten construction period, reduce labor, improve the level of mechanization, and achieve energy conservation and emission reduction as a whole, which is conducive to environmental improvement. Since 3D printing can be controlled by a computer to realize any shape design of the space, it can combine the structural force with the architectural aesthetics, reflecting the artistry of the building. Due to the uniqueness of the technology, reinforcement cannot be carried out in the 3D printed concrete, resulting in most of the 3D printed buildings being pure concrete structures. Even if a variety of flexible fibers are added, it is difficult to distribute continuously in space according to the load-bearing requirements, resulting in a serious lack of tensile strength of the material, and the failure mode exhibits obvious brittle characteristics.

The patent CN 104961367 proposes an invention for 3D printing buildings using strip steel fiber concrete. Steel fibers with a diameter of less than 5 cm and a length of less than 10 cm are used for precise distribution design as required, and steel fibers are put into concrete to enhance the mechanical performance of the concrete during printing. However, the slenderness range and spatial discontinuous distribution of the steel fibers have limited improvement in the shear resistance of the interface between the printed layers, making it difficult to meet the structural function and safety requirements. CN 106738898 A proposes a programmable directional short fiber composite material 3D printing method and device, which utilizes magnetic force to locate short thin magnetized fibers with a length of 0.05-2 mm and an aspect ratio of 2-10 to make a composite material board. CN 10971985 A proposes a 3D printing electromagnetic wave absorbing concrete directional grading feeding system. This research group proposes a construction method of 3D printing woven concrete structure as shown in CN109227875A. The flexible rope/wire is woven into the reinforced concrete structure through the positioning of shooting nails, and the continuous reinforced printed concrete structure is realized. The existing rebar planting technology has limited adaptation to the printing process, and it is difficult to adapt to the needs of space changes and enhancements. Although the rope and wire weaving proposed by this research group meets the needs of printing process and space enhancement, and realizes the integrated enhanced manufacturing process, because the rope and wire can only be placed in the gap between the layers, and the mechanical occlusion and friction provided by the surface of the rope and wire are not enough to maintain the load-bearing performance of the structure under various working conditions, resulting in the cracking of the structure concentrated in individual cracks, the weak spatial shear performance, and the limit state performance of the structure in normal use. German inventor Kai Parthy proposed a solution of mesh steel fiber filling, using a space ring to fill the concrete through the nozzle or by hand, to ensure that the printed structure has strong bearing capacity in the three directions of XYZ, and improve the structure destruction mode. However, if the aspect ratio of the space ring is too large, it is difficult to maintain the space angle during the printing process. The smooth boundary results in limited bonding effect, and the enhancement efficiency of the overall structural performance is not good.

Therefore, how to solve the insufficiency and difficulty of 3D printing concrete structure space reinforcement, and how to enhance the overall spatial mechanical performance of 3D printing concrete structure, is an urgent problem to be solved at present.

SUMMARY OF THE INVENTION

The object of the present invention is to provide a construction method of spatial aggregate reinforced 3D printed concrete structure, which can form continuous reinforced spatial aggregates, effectively improve the mechanical performance of the concrete structure space, and improve the tensile strength and crack resistance of the concrete structure space.

The present invention provides the following technical solutions:

A construction method of spatial aggregate reinforced 3D printed concrete structure, the construction method comprises the following steps:

(1) Selecting a structural member, performing mechanical analysis, and determining a basic dosage and a printing and weaving process of an implanted reinforcement or braided rope/wire material according to a stress distribution and size under an ultimate bearing capacity of the structural member.

(2) Determining a type, positioning and dosage of a spatial aggregate according to a stress distribution and size under a normal bearing capacity of the structural member. The spatial aggregate is a spatial rigid aggregate composed of biomimetic structures formed by aggregates of different shapes, the aggregate has a multi-limb structure in space, the tail of the aggregate is provided with snaps and end anchors for linking between the spatial aggregates, and the center of the spatial aggregate is provided with a clasp for socketing with reinforcement or rope/wire.

(3) Preparing 3D printing materials; editing an electromagnetic signal and positioning push program of the spatial rigid aggregate according to the selected positioning and dosage of the spatial rigid aggregate.

(4) The 3D printing material is extruded along the printing and weaving processing in step (1), and while the reinforcement is implanted or the rope/wire is woven into the space, the spatial rigid aggregate is evenly scattered. And the electromagnetic signal and positioning push program in step (3) are used to realize the connection between the spatial aggregates and the connection between the spatial aggregates and the reinforcements or ropes/wires respectively. A spatial aggregate reinforced 3D printed concrete structure is formed at one time after layer-by-layer construction, superimposed and hardened, or after segmented printing, component nodes can be connected through lap design of preset tenon and mortise and reinforcement or rope/wire to form the spatial aggregate reinforced 3D printed concrete structure.

In the spatial aggregate reinforced 3D printed concrete structure provided by the present invention, the spatial aggregate, the matrix printed with the 3D printing material and reinforcements, ropes or wires form a continuous space skeleton. The spatial aggregate can adapt to various printing paths, and achieve continuous overall synergistic force through magnetic positioning, snap design and clasp link, effectively improve the tensile strength and crack resistance of concrete structures, and improve the shear performance, bearing capacity and deformation performance of concrete structures.

In the present invention, the multi-limb and end anchor design of the spatial aggregate can effectively improve the bond strength between layers/strips, and the spatial aggregate is incorporated during printing, the spatial aggregates are linked by electromagnetic alignment and snaps to form spatially flexible tendons, with the hardening of the concrete and the bionic design of the spatial aggregates, the synergistic force between the two is effectively achieved and can effectively enhance the overall bearing capacity of the structure and improve the failure mode. There is a clasp in the center of the spatial aggregate, which can be mechanically pushed through the positioning and spliced with the continuous rope/wire woven in the printing material to form a space skeleton with good integrity, which cooperates with the matrix to ensure the safety of the structure under accidental loads and extreme working conditions.

The present invention combines the technical superiority of the existing 3D printing material rapid prototyping and the construction convenience of convenient mixing of spatial aggregates and precise quantity control. A certain proportion of high-strength spatial aggregates (that are lightweight and high-strength, bionic modeling, variable geometry, and high surface friction coefficient) are mixed with the 3D printing matrix, and using electromagnetic orientation technology, spatial aggregate modeling design and mechanical occlusal principle, improving the bonding performance, realizing the snaps link between aggregates, between aggregates and reinforcements, ropes, wires and various continuous reinforcing materials, forming a continuous spatial reinforced aggregate, improving the mechanical performance of the structure space, especially for the deficiencies of shear strength and bending toughness, and forming a new type of building structure that is different from traditional reinforced concrete structures. It not only solves the performance defects of the existing 3D printing matrix, but also makes up for the lack of structural space spanning ability. The construction is convenient and fast to apply. At the same time, spatial aggregates, reinforcements, wires, ropes and 3D printing materials are co-stressed to form a space skeleton, instead of steel cages, to ensure the mechanical properties, anti-fatigue properties and durability of spatial aggregates to enhance 3D printed concrete structures.

In step (2), the biomimetic structure formed by the aggregate is one or a combination of at least two of bimimetic structures of quinoa, cocklebur or sea urchin.

Preferably, the material of the aggregate is selected from one or a combination of at least two of steel, alloy, fiber composite material or nano-rigid material; the shape of the tail of the aggregate is selected from one or a combination of at least two of milling type, corrugation, bow type or tail hook.

In step (2), a method of determining a type, positioning and dosage of a spatial aggregate according to a stress distribution and size under a normal bearing capacity of the structural member is as follows:

(2-1) Selecting the type of spatial aggregate according to a distribution of shear stress, selecting design parameters of end anchors and snaps in the tail according to the size of a shear stress, and determining the number of limbs of the spatial aggregate according to the spatial distribution of the shear stress.

(2-2) Designing the dosage of the spatial rigid aggregate according to a safety factor determined by a ratio of principal stress/material strength, and locating the spatial aggregate according to the incorporation region and the shape of the structural member.

(2-3) Determining an encryption area of the spatial aggregate according to a size and regional distribution of the safety factor and the threshold value, wherein the threshold value is determined according to an actual value.

In step (2-1), the design parameters of the end anchor include the length and width of the tip of the end anchor, and these design parameters will directly determine the shear resistance of the clip. The spatial aggregate is linked with the end-anchor or snap at one tail through an end-anchor or snap at the tail of another spatial aggregate.

In step (3), the 3D printing material is selected from one or a combination of at least two of a cement-based material, a gypsum material or a nylon material.

In step (3), the 3D printing material further includes a reinforcing component selected from one or a combination of at least two of various types of fibers and their polymers, expanded microbeads, hollow particles or nanomaterials.

In step (4), a method of implanting reinforcement or waving rope/wire is: in the parallel printing direction, the implanting reinforcement or waving rope/wire is integrated into the 3D printing material when printing the substrate; in the vertical printing direction, implanting reinforcement or weaving rope/wire before the initial setting of the printing material after 3D printing the substrate to form a spatial reinforced grid.

Wherein, a weaving positioning point is set in the printing and weaving process, and a screw is sprayed to the weaving positioning point when the rope/wire is braided, and the braided rope/wire is wound on the sprayed screw.

In step (4), the method of segmented printing is as follows: 3D printing matrix and spatial aggregates are printed in segments according to the structural requirements of the structural member and mixed to form parts, and the prefabricated segmented components are connected by post-cast/post-tensioned printed tenon structures.

In the present invention, the materials of the reinforcement or rope/wire are selected from one or a combination of at least two of steel strands, fiber composite wires or nanowires.

In view of the lack of spatial strength and toughness of the existing 3D printing matrix, which makes it difficult to break through the limitations of the spatial span and bearing capacity of the printed structure, the present invention proposes a construction method for a spatial aggregate reinforced 3D printed concrete structure. The construction method solves the problem that the existing 3D printed concrete structure cannot be reinforced, enhances the mechanical performance of the structure, greatly improves the tensile and flexural strength and failure mode of the printed concrete, and ensures that the 3D printed concrete structure in terms of tensile, bending, cracking, impact and fatigue resistance, and has variable space, convenient construction and reduced carbon emissions during production and construction.

The present invention has the following beneficial effects due to the adoption of the above technical solutions:

1. Using 3D printing matrix to replace traditional concrete, high-strength spatial aggregate to replace steel bars, spatial positioning molding technology to replace traditional building structure technology, and forming a spatial force system, which not only reduces the construction process, reduces labor intensity, but also beautifies structural facade modeling.

2. The high-strength spatial aggregate is designed and constructed in combination with the existing reinforcement, rope and wire, which effectively improves the tensile, shear, wear and crack resistance of the 3D printing matrix, and greatly enhances the fracture toughness and impact resistance of the structure, improves the fatigue performance and durability of the structure, so that the advantages of 3D printing buildings are fully highlighted, not limited to small building structures.

3. Adopting the optimal design of the structure space, choosing the structural form reasonably, adopting the spatial positioning, and integrating the high-strength aggregate to form a strong and tough spatial structure, so that each part of the building can not only meet the different requirements of structural mechanics, but also achieve economical beauty and plastic arts on the basis of safety and reliability.

4. For a large-scale complex structural member, parts can be printed separately in different regions, and then assembled into a whole, using preset tenon joint components and post-tensioning prestressing process to enhance the integrity. The new tough structure is combined with the traditional building structure, and has flexible compatibility and universality.

BRIEF DESCRIPTIONS OF THE DRAWINGS

DETAILED DESCRIPTION OF EMBODIMENTS

The present invention will be further described in conjunction with accompanying drawing and embodiment.

The process of the spatial aggregate reinforced 3D printed concrete structure provided by the present invention is as follows: the 3D printing device prints building components or functional accessories in layers according to the preset structural space shape. While using 3D printing materials to spatially print the building matrix, the high-strength spatial aggregates are dispersed in the inter layer and inter strip defect positions of the structure by means of precise spatial positioning and quality control. Through the end anchor and snap design at the tail of the spatial aggregate, the electromagnetic signal editing technology can be used to realize the spatial positioning and linking between the aggregates. Through the design of the clasp of the aggregate centroid, it can be combined with rigid reinforcement such as existing reinforcement rebar, flexible reinforcement such as steel strand or wire rope, etc. This construction method can be adapted to a variety of printing processes and spatial shapes. Through the extrusion and hydration hardening of the printing matrix, a spatially strong and tough structure with synergistic force and uniform deformation is formed, which can have higher bearing capacity, deformation capacity, multi-directional crack resistance, and meet the needs of structural functions.

Figure 1:
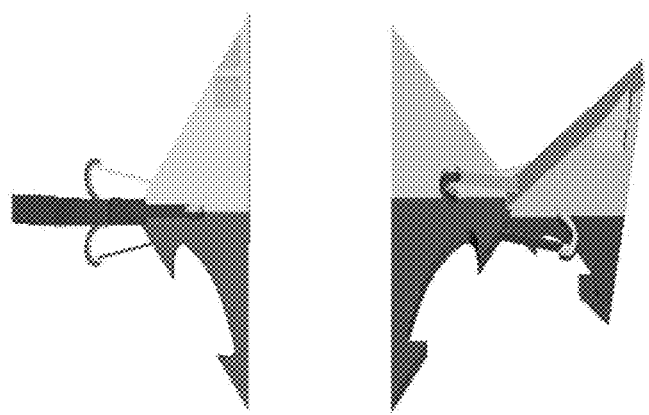
FIG. 1 is the structural representation of the spatial aggregate in the embodiment.

The construction method of the novel space aggregate reinforced 3D printed structure provided by the present invention includes the following steps:

(1) Selecting basic structural member, and using computer topology to optimize the key load combination after spatial modeling to determine the optimal spatial shape in combination with the stress nephogram;

(2) Calculating and analyzing the optimal spatial shape of the determined structural member, determining the key positions where the structural force is unfavorable, determining the printing process of the structural member, determining the basic amount of implanted reinforcements or braided ropes/wires, and the printing and weaving process, determining the type and dosage of spatial aggregate, and carrying out the arrangement of spatial aggregates. The perspective views of spatial aggregates in different directions are shown in FIG. 1. The spatial shape, number of limbs, anchor hooks and snap designs are not limited to this form.

(3) Determining the printing process according to the spatial shape of the structural member.

(4) Preparing 3D printing materials;

(5) Editing the electromagnetic signal and positioning push program according to the printing path;

(6) At the same time of printing, the robotic arm sprinkles the spatial rigid aggregate, and the spatial aggregate is linked, and the spatial aggregate is connected with the reinforcement rebar, rope or wire. A spatial aggregate reinforced 3D printed concrete structure is formed at one time after layer-by-layer construction, superimposed and hardened, or after segmented printing, component nodes can be connected through design of preset tenon and mortise and lap with reinforcement rebar or rope/wire to form the spatial aggregate reinforced 3D printed concrete structure.

Wherein, in step (2), the method of determining the basic dosage of the braided rope/wire and the method of printing and weaving process is: determining the weaving range and weaving density of the wire according to the weak surface of the structure, and determining the printing and weaving process according to the skeleton of the structural component and the weaving range and weaving density. Specifically, the weaving range is determined according to the safety factor determined by the stress/strength ratio, the encrypted weaving and ordinary weaving ranges are determined according to the safety factor and the threshold value, and the threshold value is determined according to the actual engineering situation.

Embodiment 1 Construction Method of Space Truss Girder as a Structural Member of Bridge 1. Determining the structural form and spatial structure according to the structural and functional requirements. The main stress-bearing components of bridges are generally beam or arch structures. 3D printing cement-based materials provide high compressive strength and low tensile strength. Selecting beam-type structures as the main stress-bearing structures of bridges can make full use of characteristics of the new type of spatial aggregate to enhance the tensile strength of cement-based materials. The spatial modeling of the beam structure is selected through computer topology optimization, and the optimized structural shape is used as the structural component of the 3D printed bridge.

2. Carrying out mechanical calculation and analysis on the structural member, and determining the printing and weaving process and the type of spatial aggregate (as shown in FIG. 1) added to the structural member and the amount of mixing according to an ultimate and normal bearing capacity of the structural member.

3. Preparing 3D printing materials; editing the electromagnetic signal and positioning push program of spatial aggregates according to the selected positioning and dosage of spatial rigid aggregates.

Figure 2:
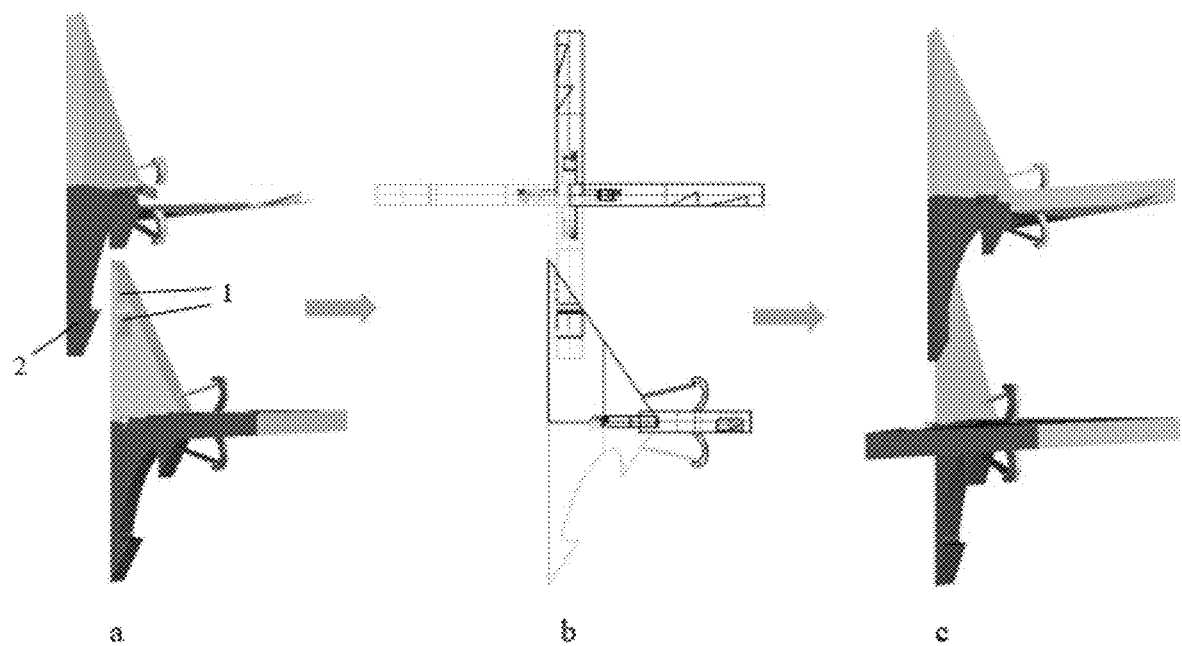
FIG. 2 is the schematic diagram of electromagnetic snap link of spatial aggregate in the embodiment.
Figure 3:
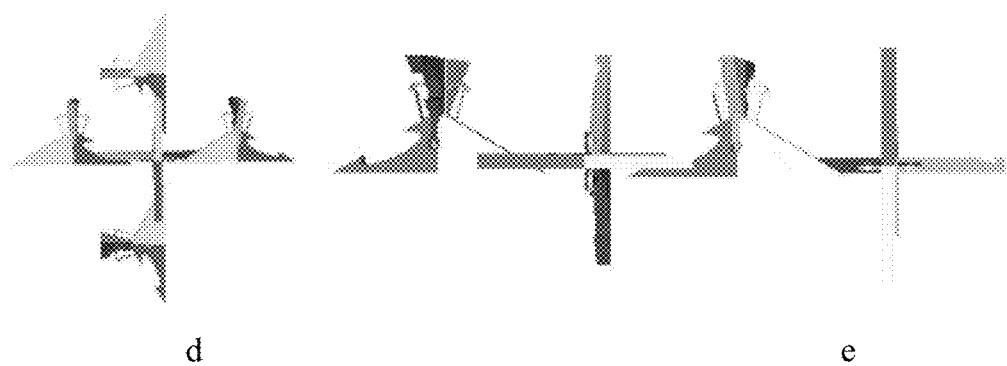
FIG. 3 is the structural schematic diagram of a plurality of spatial aggregates compounded in the embodiment.
Figure 4:
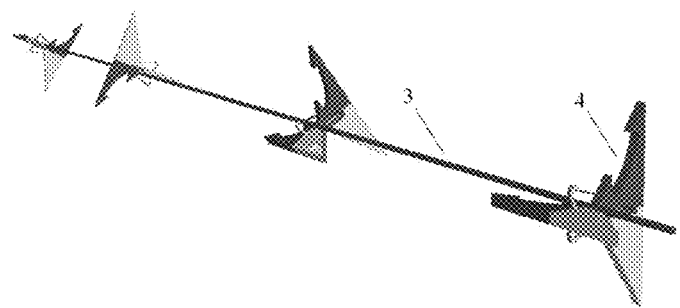
FIG. 4 is a schematic diagram of the positioning link between the spatial aggregate combination and the rope and wire rod in the embodiment.
Figure 5:
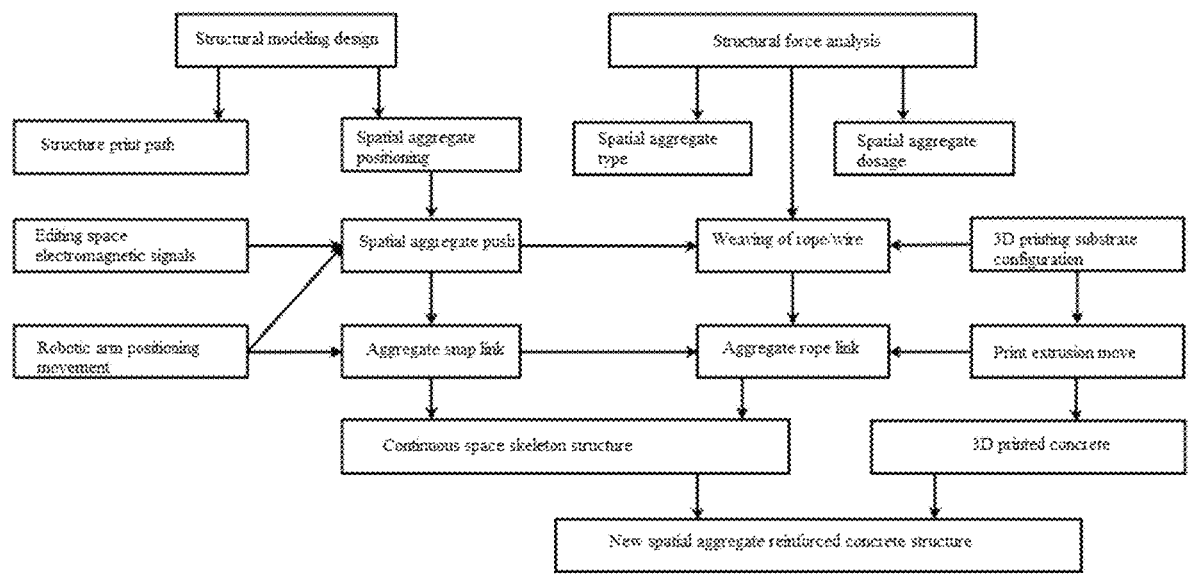
FIG. 5 is the printing flow chart of the construction method provided by the present invention.

4. According to the printing and weaving process, the 3D printing matrix is printed layer by layer. There is a robotic arm next to the printing head that carries a spatial aggregate bin, and the electromagnetic signal is edited along the printing path. The mechanical bayonet design and electromagnetic positioning at the tail end are used to realize inter-space-aggregate embedding. As shown in FIG. 2, a, b, and c are the side view before linking, the top-view wireframe after linking, and the side view after linking, respectively, the two spatial aggregates linked by a single aggregate electromagnetic snap into a composite aggregate, 1 in a is the end anchor, and 2 is the snap. The spatial aggregate realizes continuous reinforcement in all directions through spatial overlap. As shown in FIG. 3, d and e are the composite aggregate structure diagrams formed by multiple spatial aggregates linked in different ways. Using the clasp design in the centroid of the spatial aggregate center and the mechanical push to realize the connection between the spatial aggregate and the reinforcement rebar, rope or wire. FIG. 4 shows the linking combination of reinforcement, and spatial aggregate, 3 in FIG. 4 is the reinforcement rebar, rope, wire, etc. used for linking, and 4 is the spatial aggregate. The printing flow chart provided by the present invention is shown in FIG. 5. The 3D printing matrix and the spatial aggregate are bonded and solidified under the action of the upper layer of gravity, forming a solid and reliable space continuous skeleton inside, which further improves the bending, shearing and cracking resistance of the printed structure.

Figure 6:
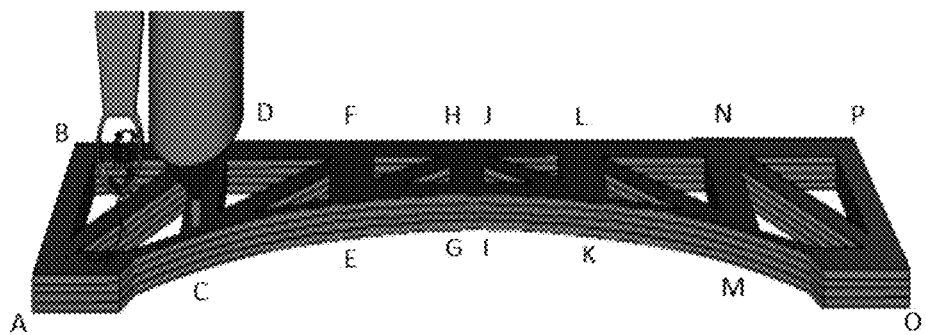
FIG. 6 is a schematic diagram of the process of the spatial aggregate reinforced 3D printing beam in the embodiment.

Specifically, in this embodiment, according to the result of the design calculation, as shown in FIG. 6, the printing of the truss beam takes A as the starting point, and the printing paths are AB, BD, DA, AC, CD, DF, FC, CE, EF, FH, HE, EG, GH, JI, IK, KJ, JL, LK, KM, ML, LN, NM, MO, ON, NP, PO, the robotic arm carries spatial aggregates along the printing path and adds according to the design quantity, and performs positioning push in the space aggregate link part.

According to the printing process and the shape of the pre-designed structural member, the construction is printed layer by layer. The spatial aggregates are linked with the rebars, ropes or wires, and the spatial aggregates are embedded between the strips to form a spatial skeleton, which forms an integral component with the printing matrix. After the components are maintained, they can be hoisted and assembled to form an overall structure.

Embodiment 2 Construction Method Involving Circular Columns as Structural Members of Bridges 1. Carrying out mechanical calculation and analysis on the column, and determining the printing weaving process and the type and dosage of rigid aggregate added to the structural member according to the ultimate bearing capacity and the normal bearing capacity of the structural member.

2. Preparing 3D printing materials; editing a electromagnetic signal and positioning push program of the spatial rigid aggregate according to the selected positioning and dosage of the spatial aggregate.

3. According to the printing and weaving process, the 3D printing matrix is printed layer by layer. There is a mechanical arm next to the printing head that carries a spatial aggregate bin, and the electromagnetic signal is edited along the printing path. The mechanical bayonet design and electromagnetic positioning at the tail end are used to realize inter-space-aggregate embedding. The spatial aggregate realizes continuous reinforcement in all directions through spatial overlap. Using the clasp design of the centroid of the spatial aggregate center and the mechanical push to realize the connection between the spatial aggregate and the reinforcement, rope or wire. The 3D printing matrix and the spatial aggregate are bonded and solidified under the action of the upper layer of gravity, forming a solid and reliable space continuous skeleton inside, which further improves the bending, shearing and cracking resistance of the printed structure.

Figure 7:
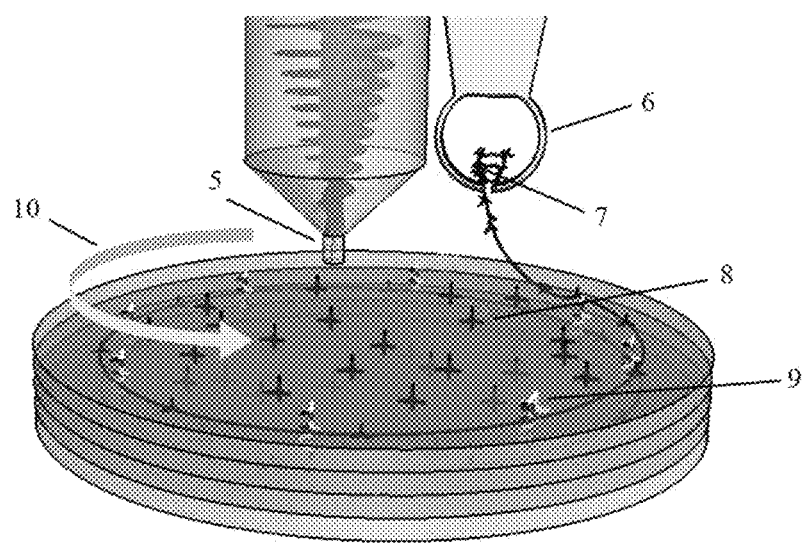
FIG. 7 is a schematic diagram of the process of the spatial aggregate reinforced 3D printing column in the embodiment.

Specifically, in this embodiment, according to the result of the design calculation, the columns are printed counterclockwise from the bottom layer, and stacked layer by layer, the robotic arm carried the spatial aggregates along the printing path and added according to the designed quantity, and pushes them in the aggregate link part. As shown in FIG. 7, 5 is the printing extrusion device, 6 is the electromagnetic editing device and the robotic arm, 7 is the link combination of the rebar, rope or wire and the space aggregate shown in FIG. 4, 8 is the embedded spatial aggregate buckled in the printing matrix as shown in FIG. 1, 9 is the longitudinal spatial aggregate combination in b in FIGS. 3, and 10 is the printing direction of the printer.

Finally, according to the printing process and the pre-designed structural shape, the construction is layer-by-layer. The interlayer aggregates are linked with rebars, ropes or wires, and the inter-strip aggregates are interlocked to form a space skeleton, which forms an integral component with the printing matrix.

The invention claimed is:

1. A construction method of spatial aggregate reinforced 3D printed concrete structure, wherein, the construction method comprises the following steps:
   (1) selecting a structural member, performing mechanical analysis, and determining a basic dosage and a printing and weaving process of an implanted reinforcement or braided rope/wire material according to a stress distribution and size under an ultimate bearing capacity of the structural member;
   (2) determining a type, position and dosage of a spatial aggregate according to a stress distribution and size under a normal bearing capacity of the structural member, wherein the spatial aggregate is a spatial rigid aggregate composed of biomimetic structures formed by aggregates of different shapes, the aggregate has a multi-limb structure in space, the tail of the aggregate is provided with snaps and end anchors for linking between the spatial aggregates, and the center of the spatial aggregate is provided with a clasp for socketing with reinforcement rebar or rope/wire;

(3) preparing 3D printing materials, and editing an electromagnetic signal and positioning push program of the spatial rigid aggregate according to the selected positioning and dosage of the spatial rigid aggregate; and (4) extruding the 3D printing material along the printing and weaving process in step (1), and while the reinforcement being implanted or the rope/wire being woven into the space, evenly scattering the spatial rigid aggregate; using the electromagnetic signal and positioning push program in step (3) to realize the connection between spatial aggregates and the connection between the spatial aggregates and the reinforcements rebar or ropes/wires respectively; forming a spatial aggregate reinforced 3D printed concrete structure at one time after layer-by-layer construction, superimposed and hardened, or after segmented printing, connecting component nodes through lap design of preset tenon and mortise and reinforcement rebar or rope/wire to form the spatial aggregate reinforced 3D printed concrete structure;

wherein, in step (2), a method of determining a type, positioning and dosage of a spatial aggregate according to a stress distribution and size under a normal bearing capacity of the structural member is as follows:

(2-1) selecting the type of spatial aggregate according to a distribution of shear stress, selecting design parameters of end anchors and snaps in the tail according to the value of shear stress, and determining the number of limbs of the spatial aggregate according to the anisotropy of the shear stress, wherein the design parameters of the end anchor comprise lengths and widths of the tips of the end anchors;

(2-2) designing the dosage of the spatial rigid aggregate according to a safety factor determined by a ratio of principal stress/material strength, and locating the spatial aggregate according to the incorporation region and the shape of the structural member; and (2-3) determining an encryption area of the spatial aggregate according to a size and regional distribution of the safety factor and the threshold value, and determining the threshold value according to an actual working condition.

2. The construction method of spatial aggregate reinforced 3D printed concrete structure according to claim 1, wherein, in step (2), the biomimetic structure formed by the aggregate is one or a combination of at least two of biomimetic structures of quinoa, cocklebur or sea urchin.

3. The construction method of spatial aggregate reinforced 3D printed concrete structure according to claim 2, wherein, the material of the aggregate is selected from one or combination of at least two of steel, alloy, fiber composite material or nano-rigid material; the shape of the tail of the aggregate is selected from one or a combination of at least two of milling type, corrugation, bow type or tail hook.

4. The construction method of spatial aggregate reinforced 3D printed concrete structure according to claim 1, wherein, in step (3), the 3D printing material is selected from one or a combination of at least two of a cement-based material, a gypsum material or a nylon material.

5. The construction method of spatial aggregate reinforced 3D printed concrete structure according to claim 1, wherein, in step (3), the 3D printing material further includes a reinforcing component selected from one or a combination of at least two of various types of fibers and their polymers, expanded microbeads, hollow particles or nanomaterials.

6. The construction method of spatial aggregate reinforced 3D printed concrete structure according to claim 1, wherein, in step (4), a method of implanting reinforcement or waving rope/wire is: in the parallel printing direction, the implanting reinforcement or waving rope/wire is integrated into the 3D printing material when printing the substrate; in the vertical printing direction, implanting reinforcement or weaving rope/wire before the initial setting of the printing material after 3D printing the substrate, forming a spatial reinforced grid.

7. The construction method of spatial aggregate reinforced 3D printed concrete structure according to claim 1, wherein, the materials of the reinforcement or rope/wire are selected from one or a combination of at least two of steel strands, fiber composite wires or nanowires.

* * * * *